INVENTOR.
Elliott I. Clemence, Jr.

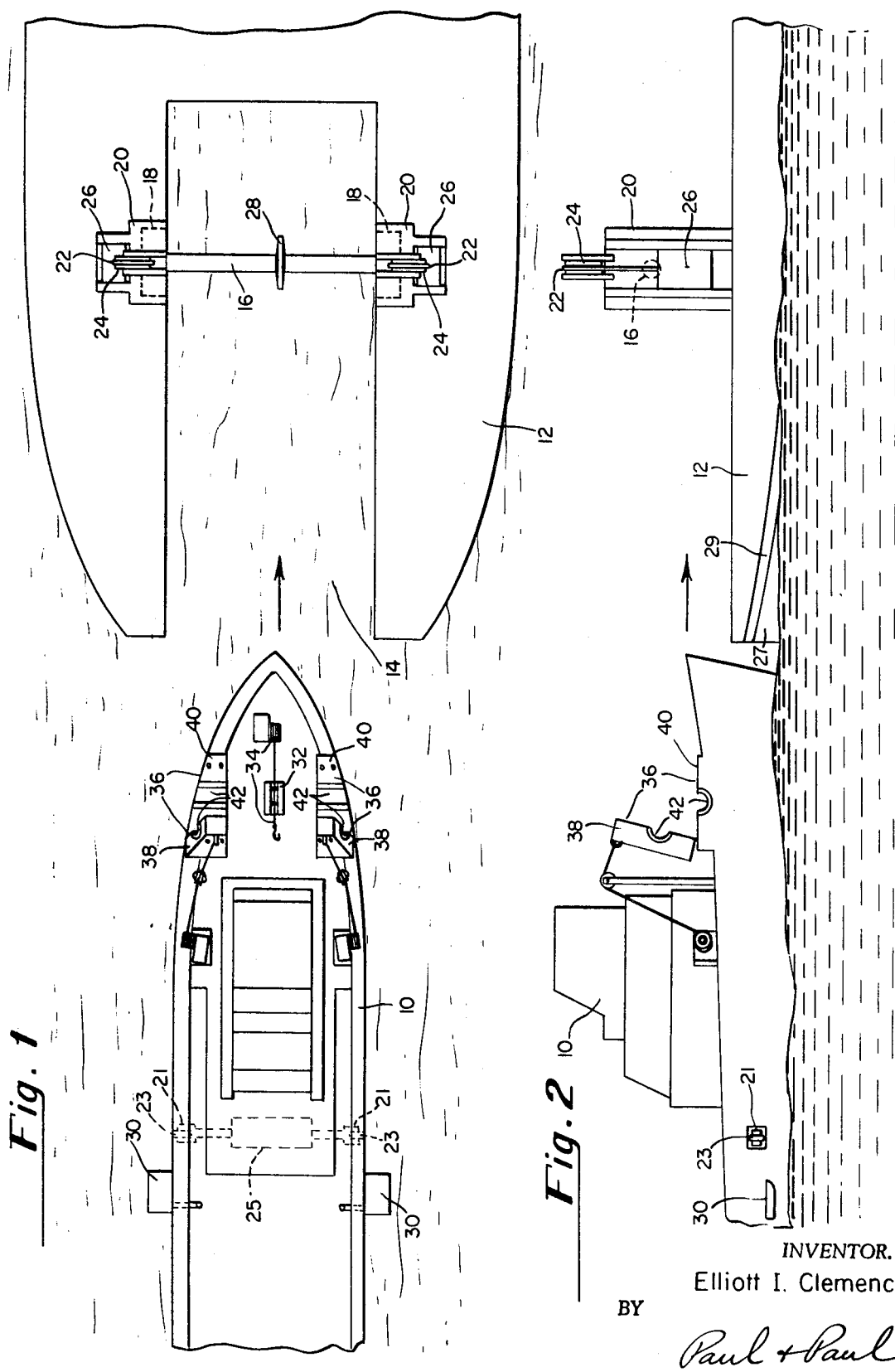

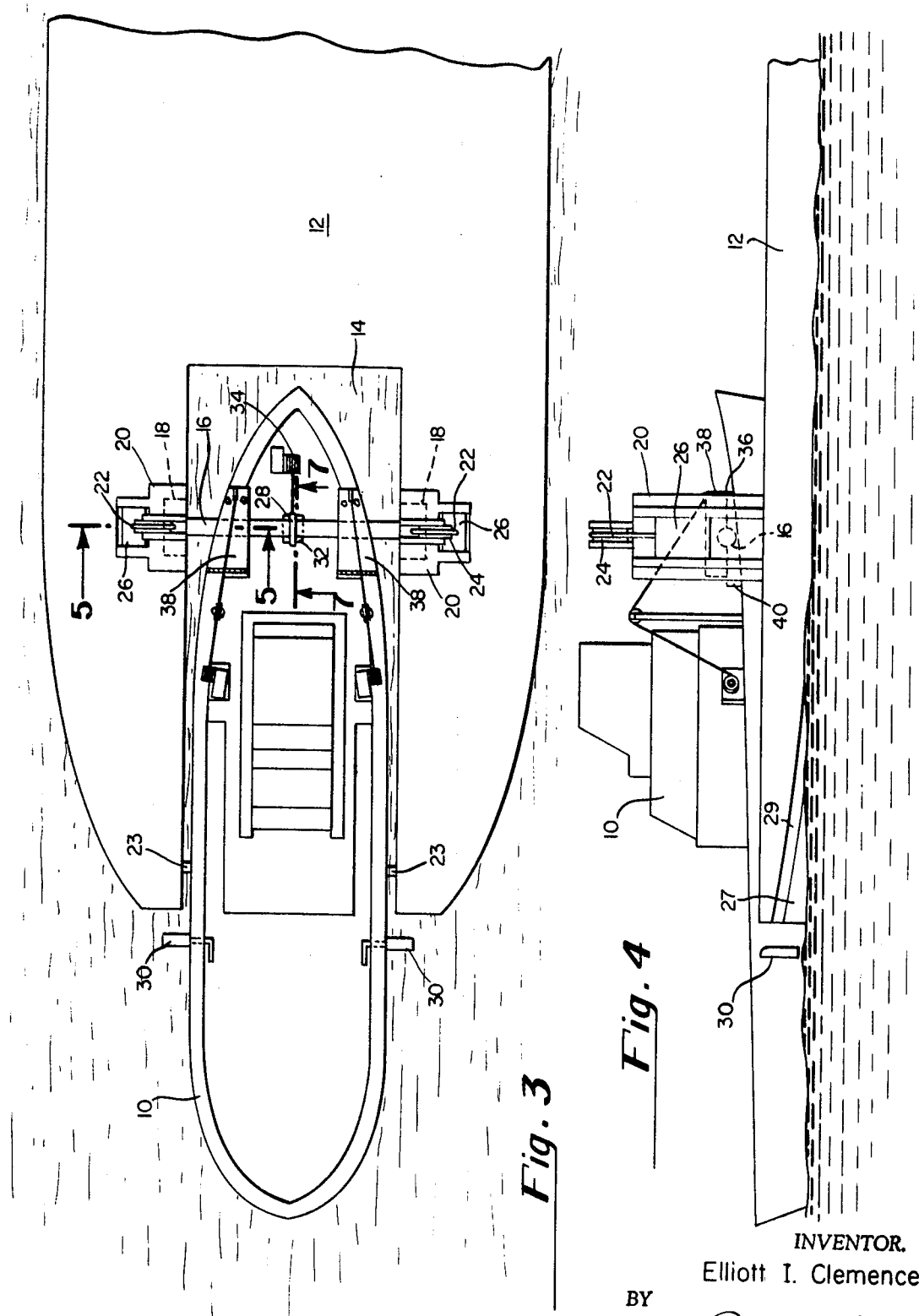

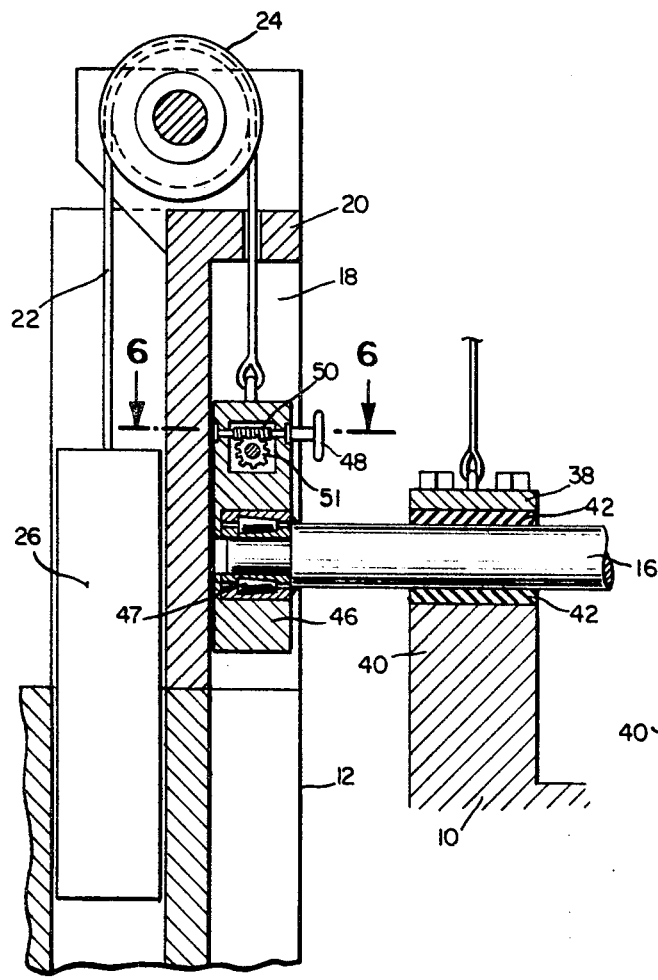
Fig. 5
Fig. 7
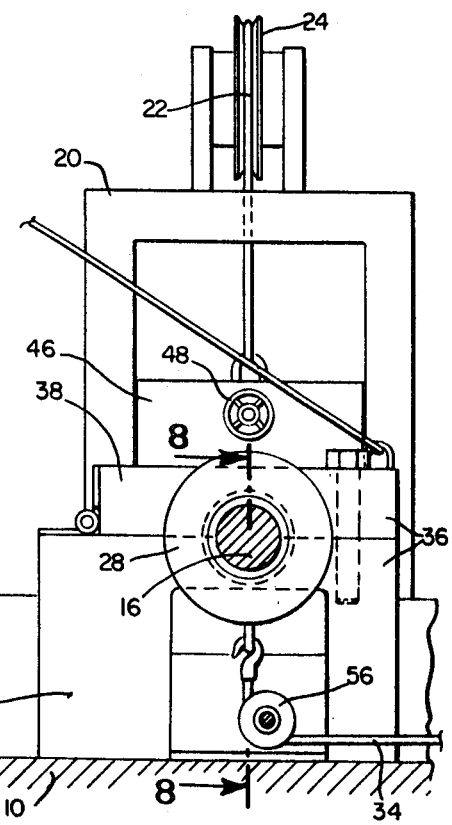
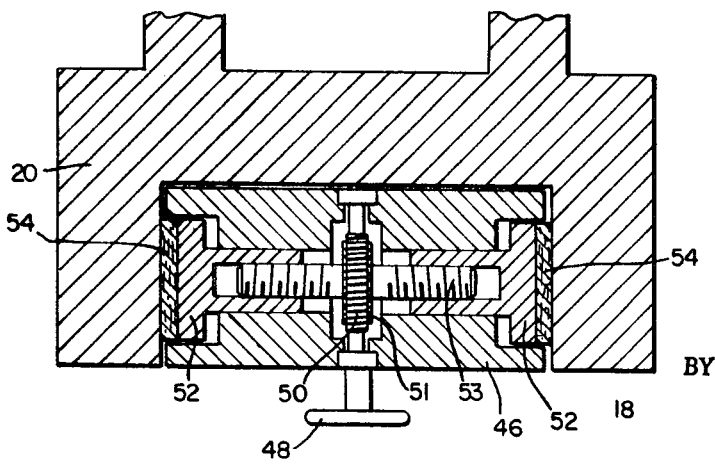
Fig. 6
Fig. 8
INVENTOR.
Elliott I. Clemence, Jr.
BY
Paul + Paul
ATTORNEYS.

United States Patent Office 3,605,675
Patented Sept. 20, 1971

3,605,675
VERTICALLY ADJUSTABLE AND ARTICULATED COUPLING FOR PUSH TUG AND BARGE COMBINATIONS
Elliott I. Clemence, Jr., Devon, Pa., assignor to Interstate Oil Transport Company, Philadelphia, Pa.
Filed Jan. 13, 1970, Ser. No. 2,526
Int. Cl. B63b *21/00*
U.S. Cl. 114—235                                            12 Claims

ABSTRACT OF THE DISCLOSURE

A push tug-barge coupling means for transmitting thrust from the tug to the barge while permitting independent pitching of the two units in a vertical plane about the coupling and restraining all other independent movement of the two units. Said coupling comprises an axle member mounted on the barge extending across a notch in the rear section thereof and mating with laterally spaced thrust bearing members mounted on the front section of a tug which fits into the notch. The axle is secured to vertically movable members in vertical channels on either side of the notch in the rear section of the barge so that the vertical position of the axle may be adjusted depending on the draft of both the tug and the barge in the water. Retractable rollers are mounted on the side of the tug aft of the tug's thrust bearing members thereby preventing uneven loading on the coupling members by keeping the centerlines of the tug and barge parallel.

INTRODUCTION AND BACKGROUND OF THE INVENTION

This invention pertains to a push-tug and barge combination and to an articulated coupling means therefor. More specifically, it pertains to a coupling which restrains independent roll and longitudinal movement of the tug and barge but permits independent pitching so that the combination is better able to tolerate rough seas. For purposes of definition independent roll, pitch or longitudinal movement occurs when either unit in a tug-barge combination is free to roll, pitch, or move along its center-line without a corresponding movement of the other unit. Independent pitching of one of the units in a coupled tug-barge combination results in a rotational movement, in a vertical plane, of one or both of the units about the coupling. Combinations in which the coupling means permits independent pitching are said to be vertically articulated. Radial movement, as used herein, refers to the rotational movement, in a horizontal plane, of one or both of the units in a coupled tug-barge combination about the coupling. The steering rudder of the tug, for example, tends to produce such movement.

Push-tug and barge combinations have heretofore been coupled in a number of ways. For example, the bow of the tug may actually contact the barge stern or the forward section of a notch in the barge stern for the transmission of thrust thereto. Tremendous vibration and wear problems would be expected in these setups, particularly in rough seas. Wire or rope which may be used in connection with such schemes are usually difficult to rig and dangerous due to their tendency to fail under the great tension and shock loads which they would experience as the tug and barge tend to move with respect to one another in rough seas.

Push bar linkages have also been suggested. These have generally been designed to permit independent roll as well as independent pitch, between the tug and barge. However, they have not been found to be practical for ocean going barges. Part of the reason for this is thought to be the tremendous force buildups which occur in any system which permits dynamic forces to build such as those developed by independent roll, pitch, and heave.

Other proposed systems include those wherein the bow of the tug, acting as the pushing element, is a convex projection with flat vertical sidewalls which mates with a concave recess with flat vertical sidewalls at the rear of the barge. In these proposed systems vertical articulation, i.e., independent pitching of the tug and barge is permitted, while all other movement, such as independent roll of the two units, is restrained. Problems of wear, strength and vibration seem to be inherently associated with these types of systems. Further, coupling and releasing under this concept must take place at a design draft of both tug and barge.

Still another concept which has been proposed is that of retractable pins in the sides of the front section of the tug. Upon the tug entering a notch at the rear of the barge the pins are extended into thrust bearing receptacles on either side of the notch in the rear of the barge. The tug and barge are permitted to pitch in a vertical plane about these pins, which independent roll of the tug and barge is restrained. Among the difficulties expected to be encountered in this system are early failure of the pins due to wear and overloading. Another expected problem is the difficulty of integrating into this design a simple means for providing for vertical adjustment of the coupling to permit coupling and releasing the tug and barge regardless of their respective drafts.

It is therefore an object of the present invention to provide a push tug-barge coupling means which permits independent pitching while substantially restraining all other independent motion of the tug and barge for optimum handling in heavy seas.

It is a further object of this invention to provide such a coupling means which is vertically adjustable so that the tug and the barge can be coupled and released and held on an even keel regardless of their respective drafts.

Still another object of this invention is to provide such a coupling means in which vibration load and wear problems are minimized and coupling and releasing may be effected quickly and easily.

BRIEF DESCRIPTION OF THE INVENTION

In the tug-barge coupling of the present invention, the stern of the barge includes a notch for receiving the front section of a push tug. On either side of this notch are vertical channel members each having vertically movable axle holding members therein between which is extended, across the notch, a thrust transmitting axle. The axle holding members and axle are counter-balanced in the vertical channel members so that the axle may be easily moved up or down to couple or release the tug and barge regardless of their respective drafts and while both the tug and the barge are maintained on an even keel. Means are also provided either in the axle holding member or in the vertical channel for controllably arresting this movement once the axle has been engaged in the receptacle therefor in the tug.

On the front section of the tug which fits into but does not touch the notch at the stern of the barge there is a thrust bearing means in which the previously described axle at the rear of the barge is engaged when the tug and barge are coupled. This thrust bearing means may comprise, for example, rigidly mounted semi-cylindrical concave bearing members, in combination with hingedly mounted semi-cylindrical concave bearing members, which together provide a complete cylindrical bearing surface.

To permit independent pitching of the tug and barge various types of bearings or bushings may be used either in the thrust bearing means of the tug or the axle holding members of the barge. Preferably the axle is gripped by a resilient material in the thrust bearing means of the tug to minimize the off-set loading of the coupling axle due to slight radial movement of the tug relative to the barge. In the vertically movable axle-holding members on the barge, the axle is secured in roller bearings which permit the axle to turn on its axis and the tug and barge to pitch independently. Aft of the coupling members, retractable members contact the adjacent vertical surfaces of tug and barge to prevent radial movement of the tug and to absorb the forces incident thereto. Such forces are generated in the horizontal plane by sea and by steering forces of the tug.

DETAILED DESCRIPTION OF THE INVENTION

This invention may be better understood by reference to the following detailed description taken in conjunction with the accompanying drawings, in which:

FIGS. 1 and 2 are plan and elevation views, respectively, of a tug and barge provided with coupling means in accordance with the present invention;

FIGS. 3 and 4 are plan and elevation views, respectively, of the same tug and barge after the engagement thereof;

FIGS. 5, 6, 7, 8 and 9 are enlarged sectional views showing details of the coupling means illustrated in FIGS. 1–4;

Figure 11:
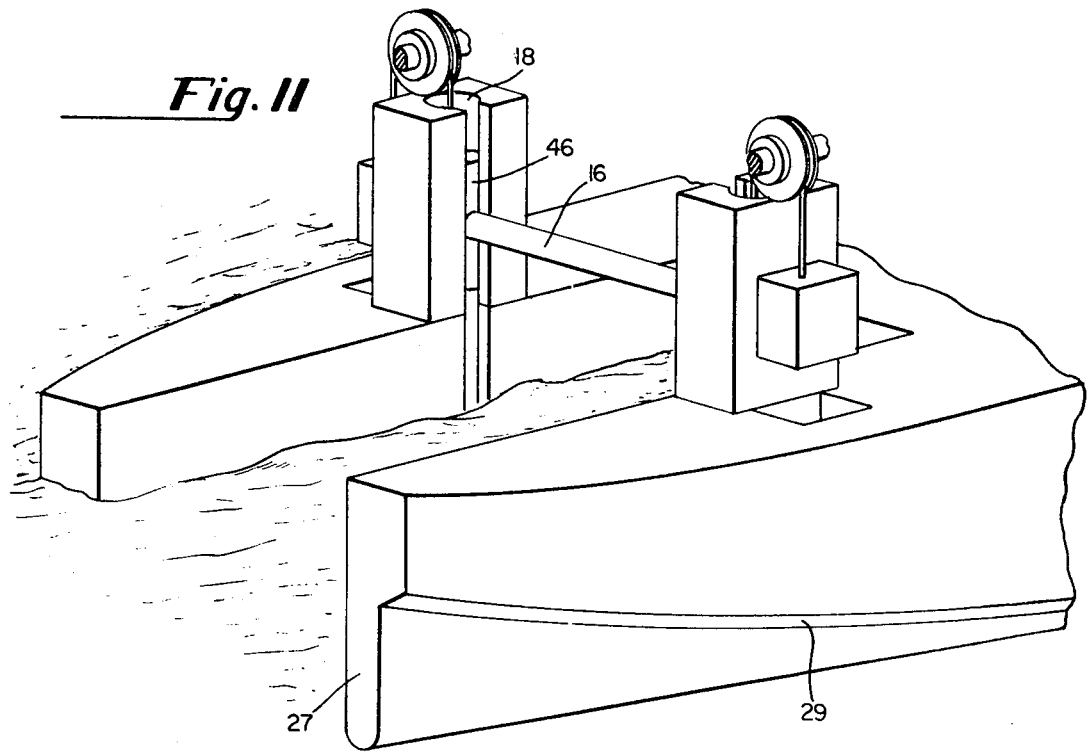
Figure 12:
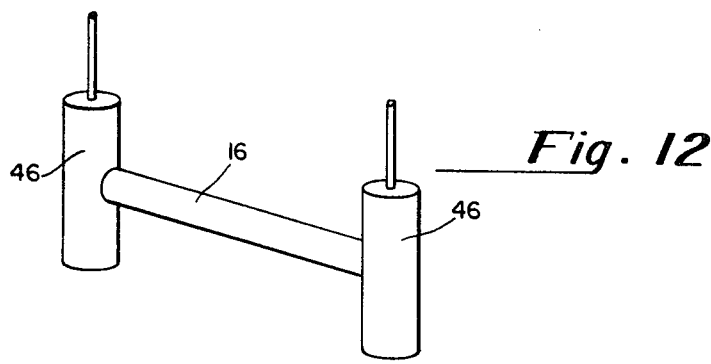
Figure 13:
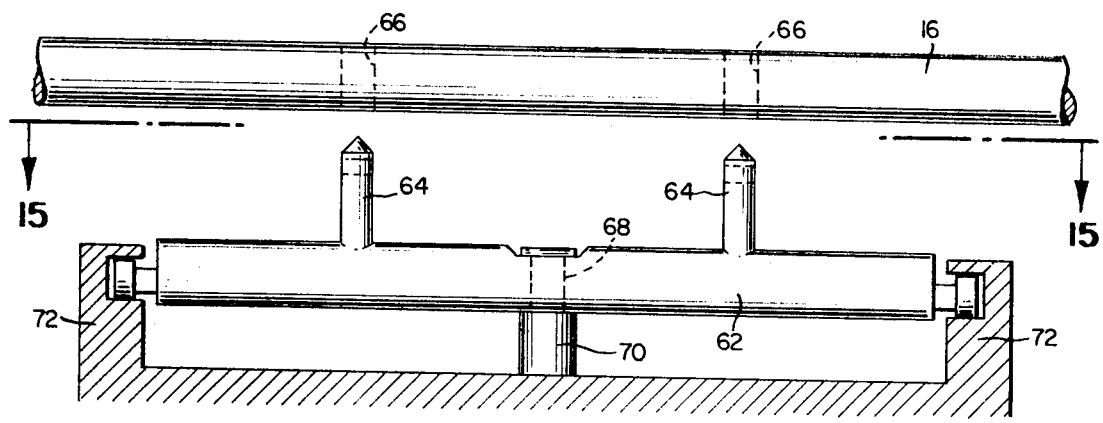
Figure 14:
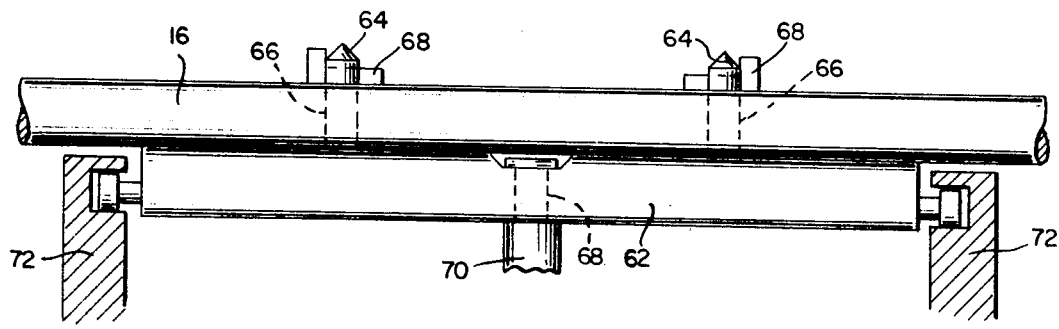
Figure 15:
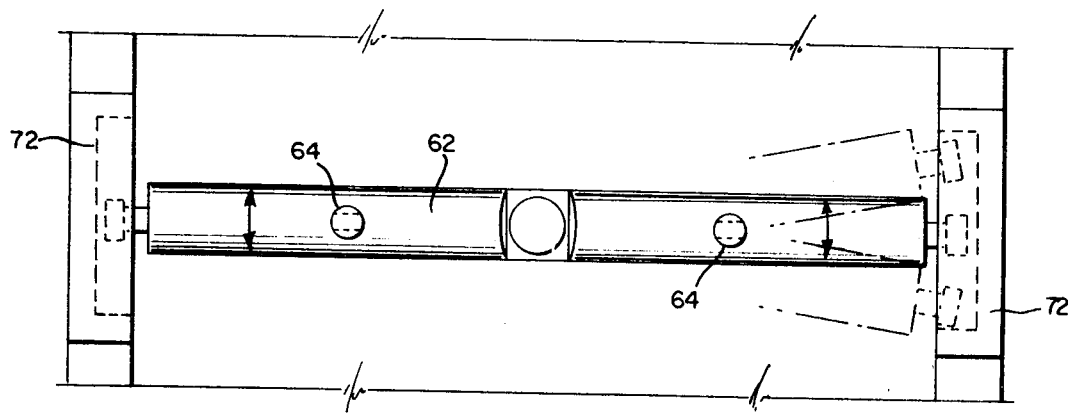

FIG. 11 is a perspective view of the barge stern and coupling means mounted thereon wherein the coupling means includes a vertically movable member with a shape, as seen in FIG. 12, different from that shown in FIGS. 1–4; and FIGS. 13, 14 and 15 show an axle and axle receiving member different than that seen in FIGS. 1–4. FIGS. 13 and 14 are front views before and after coupling. FIG. 15 is a plan view of the axle receiving means only.

Figure 9:
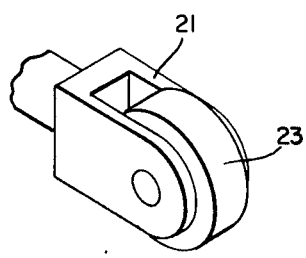

Referring more specifically to FIGS. 1 and 2, there is shown a tug 10 and a barge 12 with a notch 14 in the rear section thereof for receiving the front section of tug 10. Disposed across notch 14 is an axle 16 held by vertically movable members, not shown in FIGS. 1 and 2, in vertical channels 18 of vertical channel members 20. Axle 16 and the vertically movable members to which it is attached are counterbalanced by cables 22, pulleys 24 and counter weights 26. Axle 16 also includes a guide member 28. Tug 10, the front section of which is disposed in notch 14 of barge 12 when tug 10 and barge 12 are coupled includes stop blocks 30 to prevent the tug from going too far into notch 14 as tug 10 and barge 12 prepare for coupling. Tug 10 also includes an axle guide receiving member 32 and axle lowering winch 34. Still further, tug 10 includes receiving means for engaging axle 16, more specifically laterally spaced thrust bearing members 36, each consisting of a hinged upper segment 38 and a fixed lower segment 40 with concave semi-cylindrical bearing surfaces, preferably lined with resilient material 42 to permit slight radial movement and thereby avoid off-set loading of axle 16. Also seen in FIG. 1, in dashed lines, are retractable lateral thrust bearing members 21 and a hydraulic cylinder 25 for the extension and retraction thereof. Typically, lateral thrust bearing members 21, as shown in more detail in FIG. 9, include a means, such as roller 23, to permit the lateral thrust bearing members to ride up and down, as required, in notch 14. To provide sufficient vertical distance on the sides of notch 14 for axle 16 and lateral thrust bearing member rollers 23 to engage the thrust bearing members 36 and barge 12, respectively, regardless of the draft of tug 10 and barge 12, the sides of notch 14 may be formed of twin keels 27 extending below the rear hull 29 of barge 12. Twin keels 27 also enhance the course stability of barge 12, protect tug 10 from side force from the sea and permit the aft end of barge hull 29 to be out of the water thereby lessening the drag of barge 12.

When tug 10 and barge 12 are coupled, as seen in FIGS. 3 and 4, axle guide member 28 is positioned in axle guide receiving member 32 but generally is not in contact therewith. Upper segments 38 of thrust bearing members 36 are lowered over axle 16 and clamped to lower segments 40. In order to permit independent pitching of tug 10 and barge 12 stop blocks 30 are moved, more specifically rotated as shown in FIGS. 3 and 4, into a position, after tug 10 and barge 12 are coupled, such that there is no physical contact between stop block 30 and barge 12. Axle 16, in the preferred form of the present invention is secured by roller bearings in the axle holding members on barge 12 to permit the tug and barge to pitch independent of one another about axle 16.

It may be seen in FIGS. 3 and 4 that tug 10 and barge 12 are not in contact with each other than through thrust bearing members 36 and axle 16 and lateral thrust bearing members 21. Thrust is therefore transmitted from tug 10 to barge 12 through thrust bearing members 36, axle 16, the vertically movable axle holding members, not shown, and vertical channel members 20. As described in more detail later vertical movement of the vertically movable axle holding members in channels 18 of vertical channel members 20 may be controllably arrested after tug 10 and barge 12 are coupled. All independent movement of tug 10 and barge 12, except for independent pitching motion of the two units, is therefore restrained by the coupling means taught herein.

Looking now to FIG. 5 which is an enlarged sectional view in the plane 5—5 of FIG. 3, there is shown in detail thrust bearing member upper segment 38 and lower segment 40 with resilient bearing liner 42. Vertically movable axle holding members 46 are disposed in vertical channels 18 of vertical channel members 20. Axle 16 is retained in axle holding members 46 by roller bearings 47 which permit the axle and a tug attached to it to rotate about the axis of axle 16. Also shown are counterweight 26 along with cable 22 and pulley 24 connecting counterweight 26 with the vertically movable axle holding member 46. As shown, vertically movable member 46 also includes a hand crank 48 attached to a mechanism, better seen in the enlarged sectional view of FIG. 6, for controllably arresting the vertical movement of axle holding member 46.

In FIG. 6, there is seen threaded member 50 attached to hand crank 48 and engaging a gear 51 on threaded shaft 53. Turning hand crank 48 causes brake members 52 with friction material 54 on the outer faces thereof to move outward and engage the sides of vertical channel 18 in channel member 20 to prevent vertical movement of axle holding member 46. The height of axle 16 may therefore be adjusted, depending on whether barge 12 is loaded or unloaded and whether tug 10 has a full, partial, or very light load of fuel, so that both tug 10 and barge 12 may be readily and quickly coupled or released regardless of their respective drafts and so that both tug and barge may remain on an even keel when they are coupled. Once the coupling is made, the vertical movement of axle holding member 46 and axle 16 may be restrained by the mechanism in FIG. 6 so that all unnecessary and undesirable movement of the various components in the coupling members is restrained.

FIG. 7, a detailed sectional view in the plane 7—7 of FIG. 3, and FIG. 8, a detailed sectional view in the plane 8—8 of FIG. 7, illustrate in more detail the positioning of axle guide member 28 and axle receiving member 32. Also shown is the end of the cable of the axle lowering winch 34. The centerline positioning of axle guide receiving member 32 and pulley 56 for the cable of winch 34 facilitates the concurrent lowering and positioning of axle 16 and the engagement thereof with thrust bearing members 36.

Figure 10:
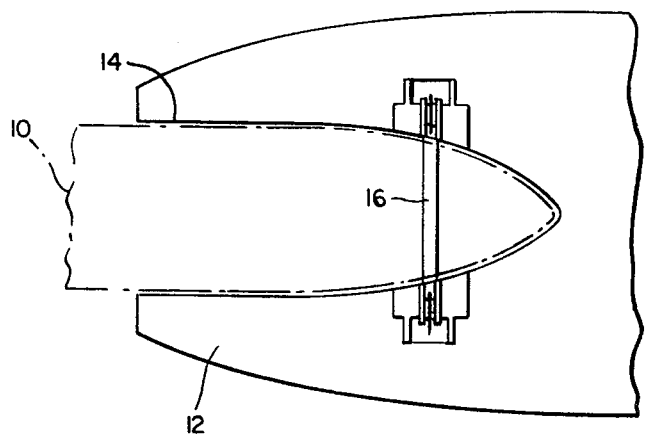
FIG. 10 is a plan view showing a notch configuration different than seen in FIGS. 1 through 4.

Various embodiments of the present invention, other than that shown in FIGS. 1-4, will be apparent to those skilled in the art. Two such modified embodiments are shown in FIGS. 10-12. In the modification shown in FIG. 10, the configuration of notch 14 in barge 12 is made to conform to the shape of the front section of tug 10. This reduces the lateral distance between tug and barge to reduce the bending moment on axle 16. It is important to note however that even in this configuration there is no physical contact between tug 10 and barge 12, except through the axle coupling means.

In another modification of the present invention, as seen in FIGS. 11 and 12, axle 16 may be held by vertically movable members 46 which are cylindrical rather than rectangular. In this case, the cross-sectional shapes of channels 18 would of course be modified accordingly. The twin keels 27 and rear hull form 29 of barge 12, as used in the preferred embodiment of the present invention are also seen in FIG. 11.

The thrust transmitting capability of the axle and axle receiving means in the embodiments of the present invention heretofore described is substantially increased by the provision of lateral thrust members 21 to absorb forces, such as those caused by the steering rudder of the tug and the seas tending to turn the tug radially. Such lateral thrust bearing members have been found in preliminary tests to reduce the maximum thrust through the main coupling members substantially by minimizing uneven loading of axle 16. Uneven or off-set loading of axle 16 is also lessened to some extent by the provision of resilient bearing liner 42 which permits slight radial movement of tug 10. The minimization of radial loading of the thrust transmitting axle may be further reduced in other embodiments of the invention, such as that seen in FIGS. 13-15. In the front views of FIGS. 13 and 14, before and after coupling, axle 16 is mated vertically with axle receiving member 62 having vertical projection 64 extending through opening 66 in axle 16. When mated, axle 16 is secured to axle receiving member 62 by means, such as hand-inserted L pin 68 inserted through suitable openings provided therefor in vertical projection member 64 of axle receiving member 62. Axle receiving member 62 is mounted through bushing 68 to mounting member 70 on the tug, which is not shown. Vertical moveent of the ends of axle receiving member 62 is restrained by end holding member 72 and roller bearings 73. Radial loading of the thrust transmitting axle 16 is minimized by permitting slight rotation of axle receiving member 62 about bushing 68. This movement, in a horizontal plane, is shown by ghost lines in the plan view of FIG. 15. In effect, in this embodiment of the invention uneven loading of the coupling means, such as is caused by any tendency of the tug to move radially, is prevented by permitting some rotational movement of the coupling means in a horizontal plane. Only a small amount of such movement would have to be permitted to substantially reduce this "radial" loading and there would have to be provided in any event lateral thrust bearing members or fenders on the tug and/or barge at some point aft of the coupling means to prevent an excess of such movement.

In another possible embodiment of the present invention, the means for controllably arresting the vertical movement of axle holding members 46 after coupling has been effected, may be hydraulic, rather than the mechanical brake means illustrated. Further this mechanism may be incorporated into vertical channel members 20 rather than in the vertically movable members 46.

In any event, the present invention provides a push tug and barge combination and a coupling means therefor which is suitable for rough seas in that the tug and barge may pitch independently of one another as they encounter waves while all other independent movement between the tug and barge is restrained so as to minimize wear and forces on the coupling means. Further the coupling means of this invention permits both the tug and the barge to be coupled and released quickly and safely and to ride level in the water, i.e., maintain an even keel, regardless of changes in their respective drafts due to fuel consumption, loading or unloading of the barge or movement of the vessels from fresh to salt water or vice versa.

It should be further noted that the vertical movement arresting means, which prevents vertical movement of the axle in the coupling means of the present invention, may be released without de-coupling the tug and barge thereby permitting the axle holding means to ride free in the vertical channel members. It may also be partially released so that movement will be permitted when the vertical load on the coupling means exceeds some pre-set limit. In some circumstances, these alternatives may be found desirable to tolerate certain sea conditions, or to permit maximum freedom between tug and barge or to permit them to regain an even keel after the draft of one of the units has been changed, such as by fuel consumption, while the units are coupled.

Although the coupling means of the present invention has been described with reference to a "tug" it should be understood that the invention can also be used on the type of "tug" usually known as a "tow-boat," i.e., a tug with a flat rather than a pointed bow. The term "tug" as used throughout this application is therefore intended to encompass such "towboats."

Similarly the notch at the rear of the barge may differ considerably from those shown and described. For example, the width of the notch may approach that of the barge itself and the part of the barge forming the sides of the notch may be simple keel extensions attached to the transom of a conventional barge.

I claim:
1. A push tug-barge copuling means for transmitting thrust from a tug to a barge while permitting said tug and said barge to rotate in a vertical plane about said coupling and restraining all other independent movement of said tug and said barge, said coupling also being vertically adjustable to facilitate the maintenance of both said tug and said barge on an even keel, regardless of their respective drafts, said coupling means comprising:
  (a) a barge with a notch in the stern thereof for receiving the front section of a tug,
  (b) a pair of channel members mounted on said barge each having a vertical channel therein, one of said channel members being disposed on one side of such notch and the other of said channel members being disposed on the other side of said notch,
  (c) two vertically movable members, one in each of said channels, and means for securing said members in said channels to controllably arrest the vertical movement thereof,
  (d) an axle, extending across said notch, the ends of which are retained in said vertically movable members,
  (e) said tug having on its front section thrust bearing means for receiving said axle when said front section is in said notch at the rear of said barge, said bearing means also substantially preventing horizontal and vertical movement of said axle, when said axle is engaged therein,
  (f) means for permitting rotational movement of said tug and said barge about said axle, and
  (g) lateral thrust bearing members disposed so as to withstand compressive forces between said tug and said barge, when said tug and said barge are coupled, near the aft end of said notch.

2. A push tug-barge coupling means, as recited in claim 1, wherein said thrust bearing means comprises a pair of laterally spaced bottom members secured to said tug, each having a concave semi-cylindrical bearing surface, said laterally spaced members also having mating top members with concave semi-cylindrical bearing surfaces therein, which top members are clamped over said axle to form with said bottom members, two laterally spaced complete cylindrical bearing surfaces.

3. A push tug-barge coupling means, as recited in claim 1, wherein said means for permitting rotational movement of said tug and said barge about said axle comprises roller bearings at the ends of said axle in said vertically movable members.

4. A push tug-barge coupling means, as recited in claim 1, wherein said tug includes a winch and associated guide means to position said axle for proper engagement with said thrust bearing members and to pull said axle downward into engagement with said thrust bearing members.

5. A push tug-barge coupling means, as recited in claim 1, wherein said axle and vertically movable members are counter-balanced in said channel members to facilitate the vertical movement thereof.

6. A push tug-barge coupling means, as recited in claim 1, wherein said vertically movable members are provided with expandable sections to controllably arrest the vertical movement of said vertically movable members.

7. A push tug-barge coupling means, as recited in claim 1, wherein said channel members are provided with expandable sections to controllably arrest the vertical movement of said vertically movable members.

8. A push tug-barge coupling means, as recited in claim 1, wherein said channel members and said vertically movable members therein are generally rectangular in cross-section.

9. A push tug-barge coupling means, as recited in claim 1, wherein said channel members and said vertically movable members therein are generally circular in cross-section.

10. A push tug-barge coupling means, as recited in claim 1, wherein said notch conforms generally in shape to that of the front section of said tug but is slightly larger so as to provide a clearance between said tug and said barge when these units are coupled.

11. A push tug-barge coupling means, as recited in claim 1, wherein said tug-mounted thrust bearing means are secured through a single bushing to said tug, said bushin being adapted to transmit thrust from said tug to said barge while permitting said thrust bearing means and said axle attached thereto to rotate slightly about said bushing, in a horizontal plane.

12. A push tug-barge coupling means, as recited in claim 1, wherein said tug-mounted thrust bearing means is lined with a resilient material which yields slightly upon radial movement of said tug to avoid uneven loading of said axle.

References Cited

UNITED STATES PATENTS 3,512,495   5/1970   Fletcher _____ 114—235

TRYGVE M. BLIX, Primary Examiner